UNITED STATES PATENT OFFICE.

ROBERT W. CORNELISON, OF BLOOMFIELD, NEW JERSEY, AND WILLIAM H. WARREN, OF BROOKLYN, NEW YORK.

PROCESS OF OBTAINING ACETO DERIVATIVES OF AROMATIC AMINS.

SPECIFICATION forming part of Letters Patent No. 574,396, dated January 5, 1897.

Application filed May 25, 1896. Serial No. 593,044. (No specimens.)

*To all whom it may concern:*

Be it known that we, ROBERT W. CORNELISON, of Bloomfield, Essex county, New Jersey, and WILLIAM H. WARREN, of Brooklyn, Kings county, New York, citizens of the United States, have invented a new and useful Improvement in the Process for the Manufacture of the Aceto Derivatives of the Aromatic Amins, of which the following is a full, clear, and exact description, and such as will enable others skilled in the art to which it appertains to use the same.

As is well known, an organic acid can be made to react with the various aromatic amins, the simplest type of which is anilin, to form the acid derivatives thereof, one atom of hydrogen in the amido groups of such amins being replaced by the acid radical. The term "aceto derivatives of the aromatic amins" is used to designate the class of crystalline compounds which are formed when acetic acid is the acid substituted for this atom of hydrogen in the amins, of which class acetanilid, ($C_6H_5.NH.C_2H_3O$,) also known as "phenylacetamid," the acetotoluids, ($C_6H_4.CH_3.NH.C_2H_3O$,) the acetxylids, ($C_6H_3.CH_3.CH_3.NH.C_2H_3O$,) and acetnaphthalid ($C_{10}H_7.NH.C_2H_3O$) are among those best known commercially.

It has not been possible to use the weaker grades of acetic acid in the manufacture of these compounds because the weak acid would not unite with the amins on account of the water and other impurities it contained, and so heretofore this class of derivative compounds has been made by heating concentrated or glacial acetic acid and a given aromatic amin or by the reaction of acetic anhydrid or acetyl chlorid with the amins. These methods of manufacture, however, are expensive because the concentrated acid, the acetic anhydrid, and the acetyl chlorid are all difficult to obtain and therefore expensive as compared with the weaker grades of the acid and the common acetic-acid salts.

In an application, Serial No. 593,043, filed by us at the same time we file the present application we have described and claimed as our invention a process for the manufacture of these substances directly from the common salts of acetic acid, thereby avoiding the use of these comparatively expensive reagents. We have also discovered that by the use of a common acetic-acid salt, such as the acetate of potassium, for example, as a carrier for the acetic acid we are enabled, through its agency, to effect the union of the weaker grades of acid with the aromatic amins without the trouble and expense of its previous concentration.

We have found that when a normal acetic-acid salt (preferably the sodium or the potassium salt) and a comparatively weak acetic acid are brought together a large percentage of the salt, especially on the application of heat, is readily converted into the so-called "acid salt" or "biacetate," one molecule of the salt taking up and holding an additional molecule of the acid, and that after the water and other impurities have been removed and the acid salt dried and mixed with the desired aromatic amin the amin, especially on the application of heat, will draw away the excess of acid carried by the acid salt and unite with it to form the aceto derivative of the amin and water. It is probable that the acetic acid (either as a free acid or as a nascent acid radical, in whichever form it is given off by the salt) and the amin first unite, to some extent at least, to form the acetate of the amin; but be this as it may, whatever the intermediate reactions and products the aceto derivative of the amin is obtained, for the greater part, as the final product.

Our newly-discovered process of manufacture, then, consists in first converting our carrier, or normal acetic-acid salt, into the acid salt and then causing the excess of acid thus taken up and carried by the salt to unite with the desired aromatic amin to form the aceto derivative thereof.

Under certain conditions a grade of acid as low as thirty per cent. can be used, and, on the other hand, the higher grades, or concentrated acid, may be used; but although our process is not limited to the use of any particular grade of acid we prefer to use a medium grade, say a fifty to sixty per cent. acid, as lower grades do not yield as satisfactory results, while the use of a concentrated acid increases the expense of the process and so defeats the main object of our invention.

It is also to be understood that we do not limit ourselves to the use of any particular salt of acetic acid as a carrier, as any salt that can be converted into an acid salt, or take up and carry an additional quantity of acetic acid, will answer our purpose. We prefer, however, the acetate of sodium or potassium, as these salts are extremely deliquescent, and, after giving up the excess of acid they have been made to take on, will perform the important secondary function of absorbing all the water formed on the final union of the acid and the amin.

It is important that the salt used should, at the start, be as free from water as possible, as it will take up the additional acid most satisfactorily when a minimum of water is present. It is best, therefore, to dehydrate the salt before it is used by thoroughly drying it.

The amount of acid required to convert the normal salt into the acid salt depends, of course, both upon the molecular weight of the particular salt and the grade of acid used. So, too, the amount of the amin to be used with a given quantity of the acid salt depends upon their molecular weights and will vary as either is changed. It is usually best, however, to have enough of the salt to yield a slight excess of acid. The proper relative proportions of the materials can be easily determined by any one accustomed to work with chemical compounds.

Taking anilin as a type of the aromatic amins and by way of illustration, in practicing our invention commercially we first dry the salt used as a carrier and mix it with the acetic acid in a suitable vessel, preferably an earthenware vessel, a good relative proportion, if the dehydrated acetate of potassium and a fifty per cent. acid are used, being ninety-eight parts by weight of the former to one hundred and twenty parts by weight of the latter. The mixture is heated to a temperature of, say, 50° to 60° centigrade (although the degree of heat required to produce the most satisfactory results varies largely, according to the circumstances) and stirred to further hasten the reaction. Under these conditions a large percentage of the salt will be converted into the acid salt almost immediately. The water and other impurities are then drawn off and the acid salt spread out to dry. After drying, the crystalline acid salt is put into a vessel, which is preferably provided with a reflex condenser or other similar contrivance, and anilin is added and mixed with it, a good relative proportion being one hundred and fifty-five parts by weight of the salt to ninety parts by weight of anilin, allowance being made for the fact that all of the normal salt may not have been converted into acid salt. This mixture is then heated to about 100° to 125° centigrade (although the degree of heat required to produce the best results varies largely, according to circumstances) and kept at practically the same temperature for some hours, (say, twelve to twenty-four, although the length of time required varies largely, according to circumstances and especially the degree of heat employed,) at the end of which time it will be found that the anilin has taken away the excess of acid carried by the salt and been converted for the greater part into acetanilid and that the salt, reduced back to its normal condition, has taken up all the water formed by the reaction. The acetanilid is thereupon separated out or recovered by allowing the melted mass to cool somewhat and then pouring it into cold water, which will dissolve the acetate of potassium and deposit the acetanilid in crystals, or it may be more convenient to add to the mixture some solvent of acetanilid, such as wood-spirit or methyl alcohol or benzene, which will dissolve out the acetanilid, and then recover it from this solution by distillation. It is desirable to recover the acetic acid and anilin that may not have been converted into acetanilid by some convenient method, such, for example, as distillation. In any event the carrier is recovered and dried and then used over again.

As above indicated, the length of time required for the operation depends very largely upon the amount of heat employed. The reactions will take place slowly and more or less completely under ordinary temperatures, but they are greatly promoted, especially the final union of the acetic acid and the amin, and a maximum yield of the aceto derivative is obtained, by a certain degree of additional heat. In commercial operations a heat of about 100° to 125° centigrade for the final or principal reaction, as specified above, is the most satisfactory, for while a materially lower degree of heat will retard the reactions and yield a smaller amount of the final product a materially higher degree of heat is objectionable, because it necessitates doing the work under pressure and in vessels that are capable of withstanding the pressure thus created and also the corroding effects of the acetic acid, so as not to be a source of danger, without increasing the amount of the aceto derivative obtained.

Of course we can take an acid salt previously made and start at this point of our process, but as the acid salts are not articles of commerce, and as it is desirable, on the ground of economy, to use the same carrier over and over again, we prefer to make it as the first step of the process.

What we claim, broadly, and desire to secure by Letters Patent, is—

1. The above-described method of producing the aceto derivatives of the aromatic amins, which consists in first converting a normal acetic-acid salt into the acid salt and then causing the excess of acetic acid thus taken up and carried by the salt to react with the desired aromatic amin.

2. The above-described method of producing the aceto derivatives of the aromatic amins, which consists in first converting the normal acetate of an alkali into the acid acetate and then causing the additional acetic acid thus taken up and carried by the salt to react with the desired aromatic amin.

3. The above-described method of producing acetanilid, which consists in first converting a normal acetic-acid salt into the acid salt and then causing the excess of acetic acid thus taken up and carried by the salt to react with anilin.

4. The above-described method of producing acetanilid, which consists in first converting the normal acetate of an alkali into the acid acetate and then causing the additional acetic acid thus taken up and carried by the salt to react with anilin.

5. The process of manufacturing the aceto derivatives of the aromatic amins by the reactions of an acid salt of acetic acid with the desired aromatic amin, substantially as described.

6. The process of manufacturing the aceto derivatives of the aromatic amins by the reactions of the acid acetate of an alkali with the desired aromatic amin, substantially as described.

7. The process of manufacturing acetanilid by the reactions of an acid salt of acetic acid with anilin, substantially as described.

8. The process of manufacturing acetanilid by the reactions of the acid acetate of an alkali with anilin, substantially as described.

R. W. CORNELISON.
W. H. WARREN.

Witnesses to signature of R. W. Cornelison:
   E. ARMANT,
   FRANK HITT.
Witnesses to signature of W. H. Warren:
   JAMES HUNTLER,
   FRANK L. FULLAM.